United States Patent
Behal et al.

(10) Patent No.: US 9,996,581 B2
(45) Date of Patent: *Jun. 12, 2018

(54) REAL-TIME SAVED-QUERY UPDATES FOR A LARGE GRAPH

(71) Applicant: Google Inc., Mountain View, CA (US)

(72) Inventors: Amit Behal, San Jose, CA (US); Keith Patrick Golden, San Francisco, CA (US); Ben Hutchinson, San Francisco, CA (US); William Chang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/488,852

(22) Filed: Apr. 17, 2017

(65) Prior Publication Data

US 2017/0220636 A1    Aug. 3, 2017

Related U.S. Application Data

(63) Continuation of application No. 14/306,969, filed on Jun. 17, 2014, now Pat. No. 9,626,407.

(51) Int. Cl.
*G06F 17/30* (2006.01)

(52) U.S. Cl.
CPC .. *G06F 17/30448* (2013.01); *G06F 17/30477* (2013.01); *G06F 17/30864* (2013.01); *G06F 17/30958* (2013.01)

(58) Field of Classification Search
None
See application file for complete search history.

(56) References Cited

U.S. PATENT DOCUMENTS

| 6,581,205 | B1 | 6/2003 | Cochrane et al. |
| 6,826,562 | B1 * | 11/2004 | Leung .............. G06F 17/30451 707/713 |
| 7,752,199 | B2 | 7/2010 | Farrell |

(Continued)

FOREIGN PATENT DOCUMENTS

| CA | 2653465 A1 | 12/2007 |
| RU | 2419862 C2 | 5/2011 |

OTHER PUBLICATIONS

International Search Report and Written Opinion for PCT Application No. PCT/US2015/033967, dated Aug. 19, 2015, 12 Pages.

(Continued)

*Primary Examiner* — Anh Tai Tran
(74) *Attorney, Agent, or Firm* — Brake Hughes Ballermann LLP

(57) ABSTRACT

A system for automatically updating saved query results for a graph responsive to a graph update is disclosed. The system may identify a target constraint responsive to an update to the data graph. The system may use an index of constraints organized by edge. The target constraint specifies a path in a data graph that includes an edge specified in the update. The system may determine a state for the target constraint by traversing the graph via the path and determine based on the state, whether a member node represents a change to the saved query result. The system may then update a saved query result for the query using the member node identified during the traversal in accordance with the change.

20 Claims, 10 Drawing Sheets

(56) References Cited

U.S. PATENT DOCUMENTS

| | | | |
|---|---|---|---|
| 7,873,627 B2* | 1/2011 | Grabs | G06F 17/30463 707/713 |
| 7,877,377 B2* | 1/2011 | Day | G06F 17/30457 707/718 |
| 7,966,314 B2* | 6/2011 | Zuzarte | G06F 17/30979 707/713 |
| 8,484,159 B2 | 7/2013 | Stanfill et al. | |
| 8,682,932 B2 | 3/2014 | Raghavan et al. | |
| 8,688,683 B2* | 4/2014 | Simon | G06F 17/30463 707/713 |
| 9,081,578 B1 | 7/2015 | Berg et al. | |
| 9,626,407 B2 | 4/2017 | Behal et al. | |
| 2005/0235001 A1 | 10/2005 | Peleg et al. | |
| 2009/0006314 A1* | 1/2009 | Balmin | G06F 17/30979 |
| 2009/0083852 A1 | 3/2009 | Kuo et al. | |
| 2011/0131199 A1 | 6/2011 | Simon et al. | |
| 2012/0317142 A1 | 12/2012 | Broecheler et al. | |
| 2014/0304251 A1 | 10/2014 | Bornea et al. | |
| 2014/0337373 A1 | 11/2014 | Morsi et al. | |
| 2014/0379690 A1* | 12/2014 | Ahmed | G06F 17/30448 707/713 |
| 2015/0363461 A1 | 12/2015 | Behal et al. | |

OTHER PUBLICATIONS

"Materialized view", Wikipedia, the free encyclopedia, XP055206080, May 19, 2014, 3 Pages.

Office Action for Russian Patent Application No. 2016149782 (with translation), dated Jul. 13, 2017, 9 pages.

* cited by examiner

REAL-TIME SAVED-QUERY UPDATES FOR A LARGE GRAPH

RELATED APPLICATION

This application is a continuation of, and claims priority to, U.S. application Ser. No. 14/306,969, filed on Jun. 17, 2014, entitled "Real-Time Saved-Query Updates for a Large Graph," the disclosure of which is incorporated herein in its entirety.

BACKGROUND

Large graph-based knowledge bases represent factual information about the world. For example, in a data graph, entities, such as people, places, phrases, words, classes, facts, things, concepts, etc., may be stored as nodes and the edges between nodes may indicate a relationship between the entities. The basic unit of such a data graph can be a triple that includes two nodes, or entities, and an edge label. The first node is sometimes referred the source or subject node, and the second node is sometimes referred to as the target or object node. Of course, a triple may include additional information, such as metadata about the entities and/or the relationship, in addition to identifying the subject, predicate, and object.

Users can define queries or collections for the graph. A collection or query defines constraints a node must satisfy to be a member of the set of nodes responsive to the query. The constraints usually specify what relationship(s) a node must have or not have to be a member of the query results, e.g., a member of the collection. Such queries (i.e., collections) are used extensively in search, data mining, ad targeting, recommendation systems, etc., and membership is often stored because calculating membership can be expensive in a large graph. But as nodes and relationships are added or deleted from the graph, the saved members can become stale, especially in large graphs that are frequently updated.

SUMMARY

Some implementations enable a system to update saved query results in real-time as edges are updated, e.g., as triples are added to or deleted from the graph-based data store. Real-time can include a short delay (e.g., less than one minute), to allow the system to group updates by the source node of the triple. Queries may be defined by constraints, which identify properties or relationships a node must have (or not have) in the graph to qualify as a result for the saved query. A saved query may be defined by a constraint expression, which is a series of constraints joined by logical operations, in other words a Boolean expression of constraints. The system may include an index of constraints that is indexed by edge. The system may use the index to determine which constraints match the edge from an updated triple, thus identifying target constraints for that triple. The system uses the target constraints to efficiently determine which stored query results are affected by the update, and whether the update results in a change to the results. By grouping updates by subject, the system may re-use work, e.g., forward and backward walks in the graph, in identifying and evaluating query results affected by the updates.

One aspect of the disclosure can be embodied in a system that includes at least one processor and one or more memories. The one or more memories may store a data graph that includes nodes connected by edges and a plurality of saved queries, each query defined by one or more constraints to be satisfied for membership in query results for the query, each constraint specifying an at least one of the edges. The one or more memories may also store instructions that, when executed by the at least one processor, cause the computer system perform operations. The operations may include identifying a target constraint responsive to an operation that updates the data graph with a source node, an update edge, and a target node, the target constraint specifying a path that includes the update edge and the target constraint belonging to a first saved query of the plurality of saved queries. The operations may also include evaluating the target constraint for a member node to determine a state for the target constraint by traversing the graph via the path of the target constraint, determining whether a collapsed definition for the first saved query, based on the state, indicates the member node is responsive or not responsive to the first saved query, and updating a saved query result of the first saved query with the member node in accordance with the collapsed definition when the collapsed definition indicates the member node is responsive or not responsive.

The system can include one or more of the following features. For example, the target constraint may be a first target constraint and the operations may also include identifying a second target constraint belonging to the first saved query, the second target constraint specifying a path including the update edge, the second target constraint having a path length longer than a path length of the first target constraint, and setting a state for the second target constraint to a state indicating the second target constraint is unresolved. Furthermore, the state may be a first state and the operations may also include determining that a collapsed definition for the first saved query, based on the first state, fails to indicate whether the member node is responsive or not responsive to the first saved query, evaluating the second target constraint for the member node to determine a second state for the second target constraint by traversing the graph via the path of the second target constraint, determining whether the collapsed definition for the first query, based on the first state and the second state, indicates the member node is responsive or not responsive to the first saved query, and updating the saved query result of the first saved query with the member node according to the collapsed definition when the collapsed definition indicates the member node is responsive or not responsive.

As another example, the one or more memories may also store an index of the constraints by edge, the index being used to identify the target constraint. As another example, the operations may also include storing results of the traversal of the data graph and using the stored results to evaluate a second target constraint that specifies a path that includes the path of the target constraint. As another example, the update may be a first update and the operations may include storing results of the traversal of the data graph and deleting the stored results when a subsequent update to the data graph includes a source node that differs from the source node of the first update.

As another example, the target constraint may be a first target constraint and the state may be a first state and the operations may include storing a result of the traversal of the graph in the memory, identifying a second target constraint for the first query, the second target constraint having a path that includes the path of the first target constraint, and using the stored result of the traversal in evaluating the second target constraint to determine a second state for the second target constraint. The operations may further include determining whether the collapsed definition for the first saved query, based on the first state and the second state, indicates the member node is responsive or not responsive to the first saved query and updating the saved query result of the first saved query with the member node according to the collapsed definition when the collapsed definition indicates the member node is responsive or not responsive.

As another example, the target constraint may be a first target constraint and the operations may also include identifying a plurality of target constraints, the first target constraint being one of the plurality of target constraints, the plurality of target constraints being for at least two queries, and the first saved query being one of the at least two queries. The operations may also include intelligently evaluate the plurality of target constraints to delay traversals for target constraints with longer path lengths.

In another aspect, a computer-implemented method includes identifying, using at least one processor, a target constraint, the target constraint specifying a path in a data graph that includes an edge specified in an update to the data graph, the identifying being triggered by the update, and determining, using the at least one processor, a state for the target constraint by traversing the graph via the path. The method also includes determining, based on the state, that a collapsed definition for a first query that includes the constraint indicates a member node is responsive to the first query, and updating a saved query result for the first query using the member node identified during the traversal in accordance with the collapsed definition. In some implementations, the target constraint is identified using an index of a plurality of constraints, the index being organized by edge. When the update includes an addition of the update edge between a source node and a target node, updating the saved query result in accordance with the collapsed definition includes adding the member node to the saved query result. When the update includes a removal of the update edge between a source node and a target node and updating the saved query result in accordance with the collapsed definition includes maintaining the saved query result.

The method can include one or more of the following features. For example, the target constraint may be a first target constraint and the method further includes identifying a second target constraint belonging to the first query, the second target constraint specifying a path including the update edge, the second target constraint having a path length longer than a path length of the first target constraint and setting a state for the second target constraint to a state indicating that the second target constraint is unresolved. In some implementations, the state may be a first state and the method further includes determining that collapsed definition for the first query, based on the first state, fails to indicate whether the member node is responsive or not responsive to the first query, evaluating the second target constraint for the member node to determine a second state for the second target constraint by traversing the graph via the path of the second target constraint, determining that the collapsed definition for the first query, based on the first state and the second state, indicates the member node is responsive to the first query, and updating the saved query result of the first query with the member node according to the collapsed definition.

As another example, the target constraint may be a first target constraint and the state may be a first state and the method also includes storing a result of the traversal of the graph, identifying a second target constraint for the first query, the second target constraint having a path that includes the path of the first target constraint, and using the stored result of the traversal in evaluating the second target constraint to determine a second state for the second target constraint. In such implementations, determining that the collapsed definition for the first query indicates the member node is responsive to the first query is based on the first state and the second state.

As another example, the method may also include grouping a plurality of updates to the data graph by source node, the plurality of updates occurring within five minutes of each other and the update to the data graph being one of the plurality of updates, wherein identifying the target constraint occurs in real-time after the grouping.

In another aspect, a method includes identifying, using at least one processor, a target constraint, the target constraint specifying a path in the data graph that includes the update edge responsive to an operation that updates a data graph with a source node, an update edge, and a target node. The method also includes determining, using the at least one processor, a state for the target constraint by traversing the graph via the path, determining that a collapsed definition, based on the state, for a first query that includes the constraint indicates a member node is not responsive to the first query, and updating a saved query result for the first query using the member node identified during the traversal in accordance with the collapsed definition.

In some implementations, the update is removal of the update edge between the source node and the target node and updating the saved query result in accordance with the collapsed definition includes removing the member node from the saved query result. In some implementations, the update is an addition of the update edge between the source node and the target node and updating the saved query result in accordance with the collapsed definition includes maintaining the saved query result.

In another general aspect, a computer program product embodied on a non-transitory computer-readable storage device includes instructions that, when executed by at least one processor formed in a substrate, cause a computing device to perform any of the disclosed methods, operations, or processes. Another general aspect includes a system and/or a method for updating saved query results in real time, substantially as shown in and/or described in connection with at least one of the figures, and as set forth more completely in the claims.

One or more of the implementations of the subject matter described herein can be implemented so as to realize one or more of the following advantages. As one example, the system may update saved query results in real-time, meaning that the process to update saved query results begins within a few minutes of the update, and are triggered by the update, rather than waiting for a periodic, offline batch process to update the memberships. Implementations are able to quickly and efficiently evaluate target constraints, making the real-time updates to saved query results possible In other words, the system minimizes the quantity of additional lookups required to maintain correct results of the saved queries by using information in the graph update to identify a minimum number of additional constraints in affected queries to evaluate and grouping graph updates together to reuse the result of previous work. Other features will be apparent from the description and drawings, and from the claims.

BRIEF DESCRIPTION OF DRAWINGS

Like reference symbols in the various drawings indicate like elements.

DETAILED DESCRIPTION

Figure 1:
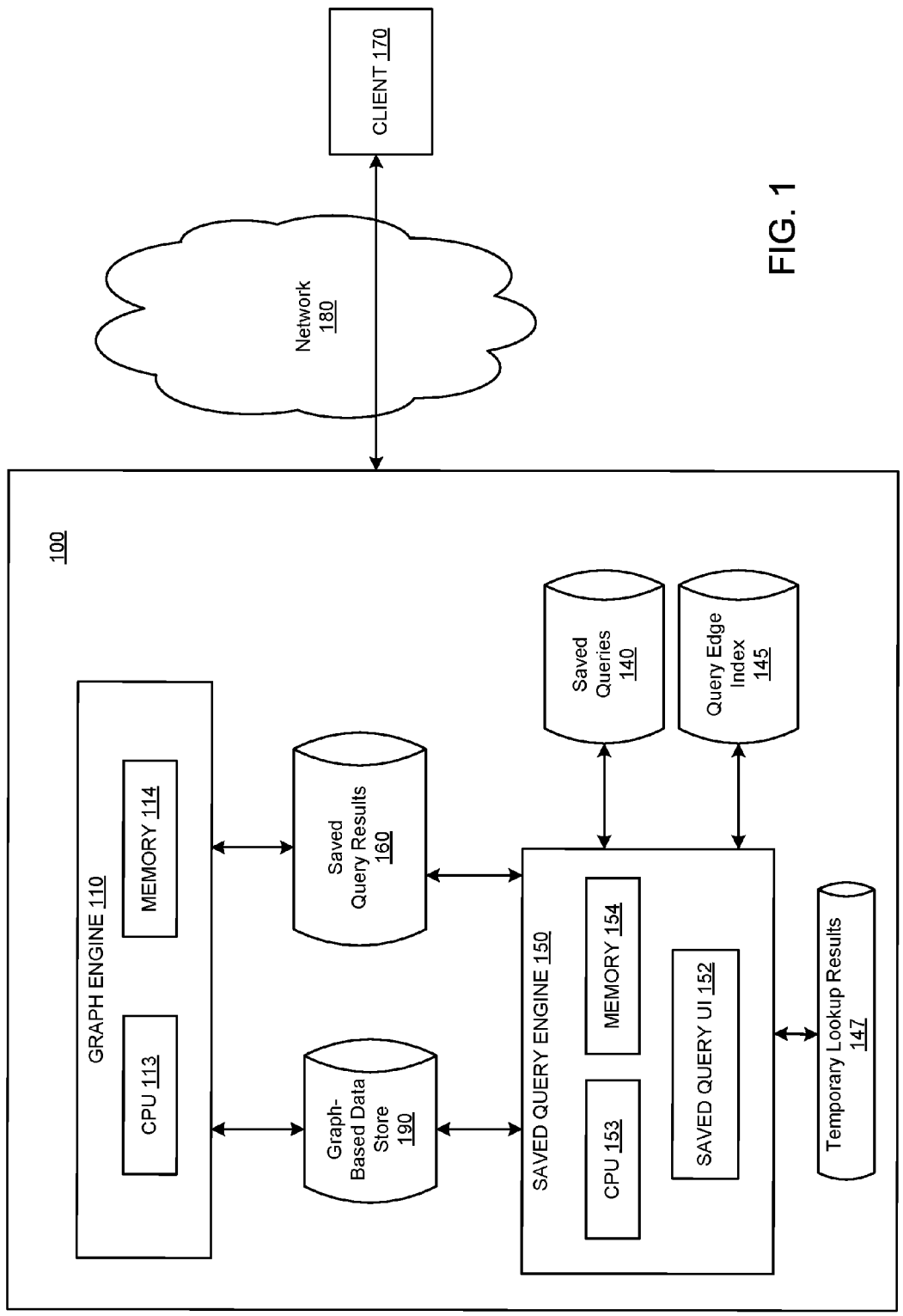
FIG. 1 illustrates an example system in accordance with some implementations.

FIG. 1 is a block diagram of a system 100 in accordance with an example implementation. The system 100 updates saved query results in real-time in response to edge updates in a data graph. The system of FIG. 1 is one example implementation and other configurations and applications may be used. While the system 100 can be used to keep stored query results fresh in any data graph, the system 100 is especially useful for large graphs as the processing time to determine query results in such graphs is often cost-prohibitive and time-prohibitive.

Figure 9:
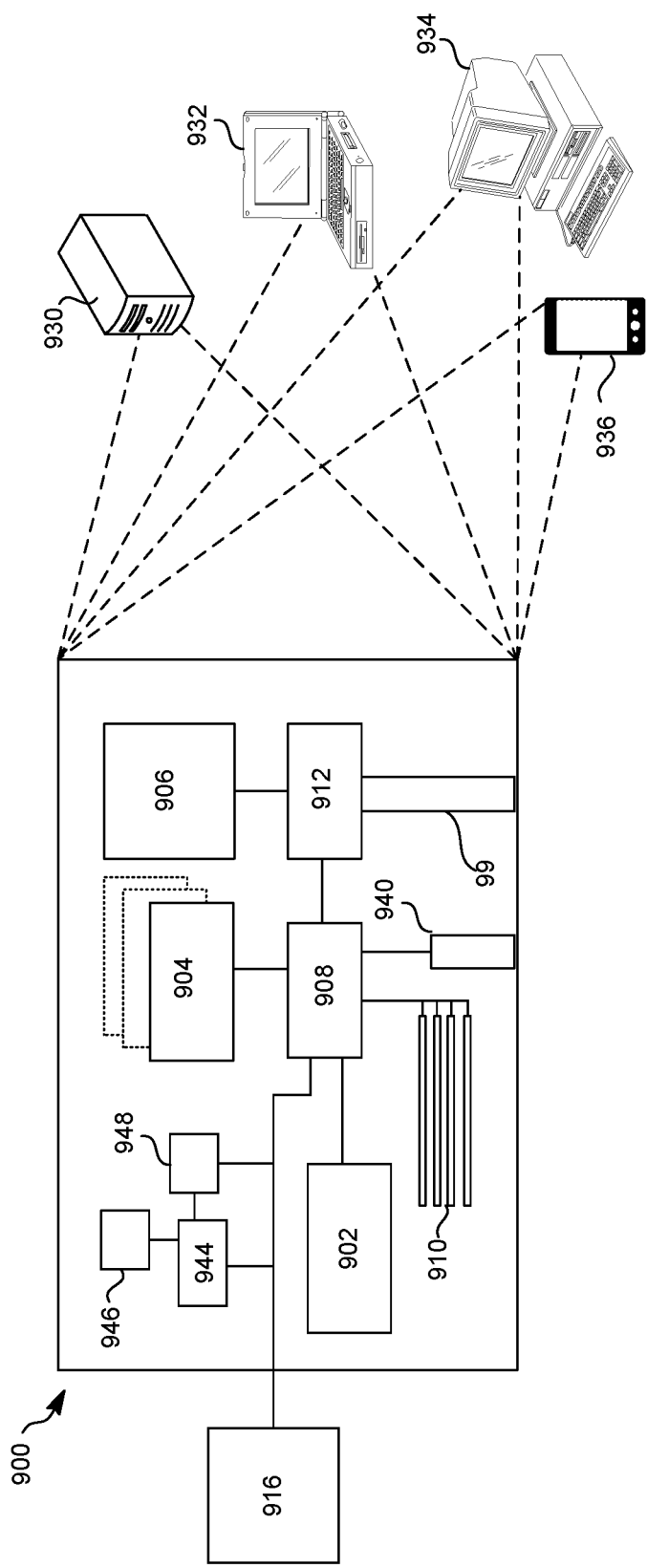
FIG. 9 shows an example of a computer device that can be used to implement the described techniques.
Figure 10:
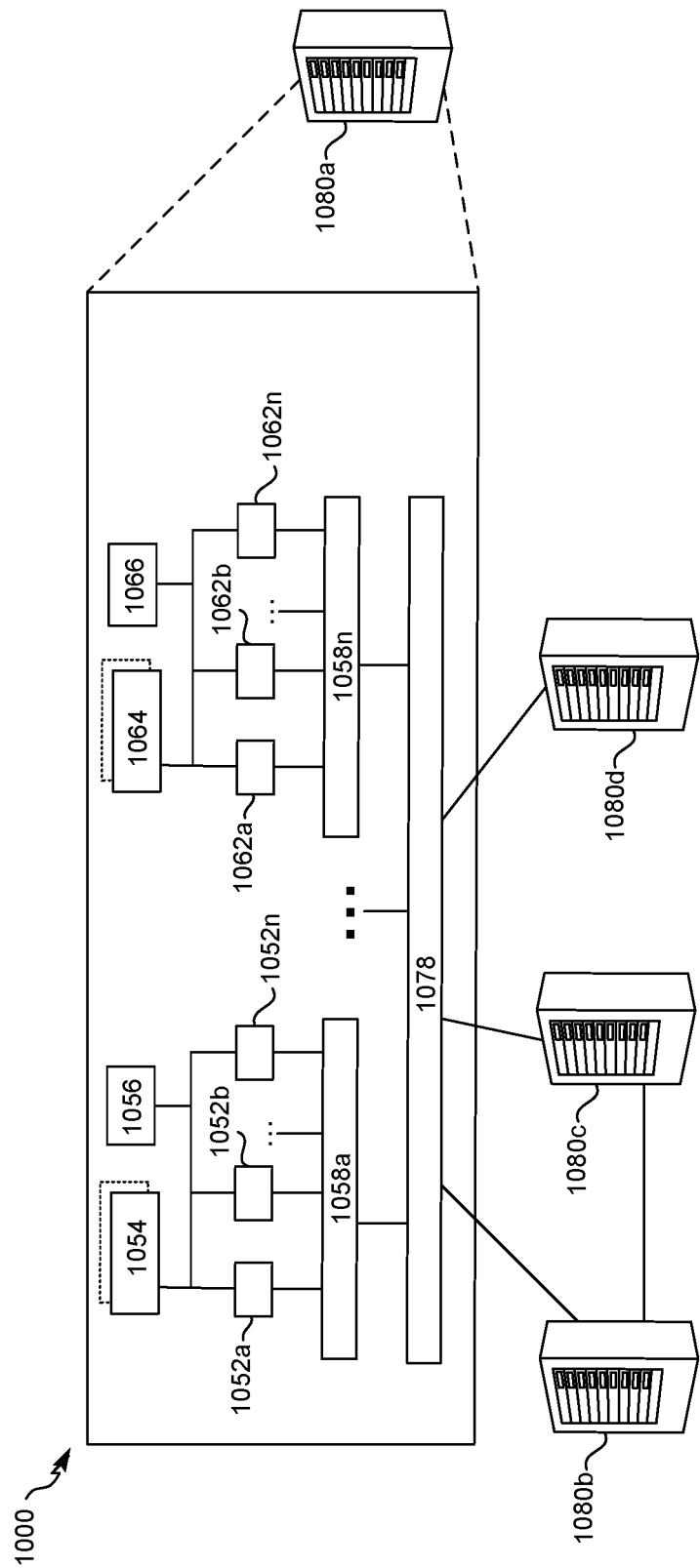
FIG. 10 shows an example of a distributed computer device that can be used to implement the described techniques.

The system 100 may be a computing device or devices that take the form of a number of different devices. For example the system 100 may be a standard server, a group of such servers, a client-server system, or a rack server system. In addition, system 100 may be implemented in a personal computer. The system 100 may be an example of computer device 900, as depicted in FIG. 9, or computer device 1000, as depicted in FIG. 10.

The system 100 may include a graph engine 110 and a saved query engine 150. In some implementations, graph engine 110 and saved query engine 150 may each be a separate computing device, or they may share components, such as processors and memories. For example, the graph engine 110 and the saved query engine 150 may be implemented in a personal computer, a server, one or more logical partitions of a computer, etc. In some implementations, one or more of the graph engine 110 and the saved query engine 150 may be distributed systems implemented in a series of computing devices, such as a group of servers, such as computer device 1000, as depicted in FIG. 10.

The system 100 may include a graph-based data store 190. A graph-based data store is a data graph that stores information in the form of nodes and edges, with nodes being connected by edges. A node in a data graph may represent an entity, such as a person, place, item, word, phrase, idea, topic, abstract concept, concrete element, other suitable thing, or any combination of these, or a property of an entity. Nodes may thus be referred to as entities and vice-versa. Entities in the graph may be related to each other by edges, which may represent relationships between entities. For example, the data graph may have an entity that corresponds to Abraham Lincoln and the data graph may have an occupation relationship between the Abraham Lincoln entity and a President entity and another such relationship between the Abraham Lincoln entity and a Lawyer entity. An indexing engine may maintain the graph-based data store 190 to allow a search engine to search the data graph, for example finding entities related to other entities by one or more relationships or paths in the graph. In some implementations, the indexing engine and/or the search engine may be included in the graph engine 110. The graph-based data store 190 may include an index or some other method for searching for and retrieving data from the data store.

Figure 2:
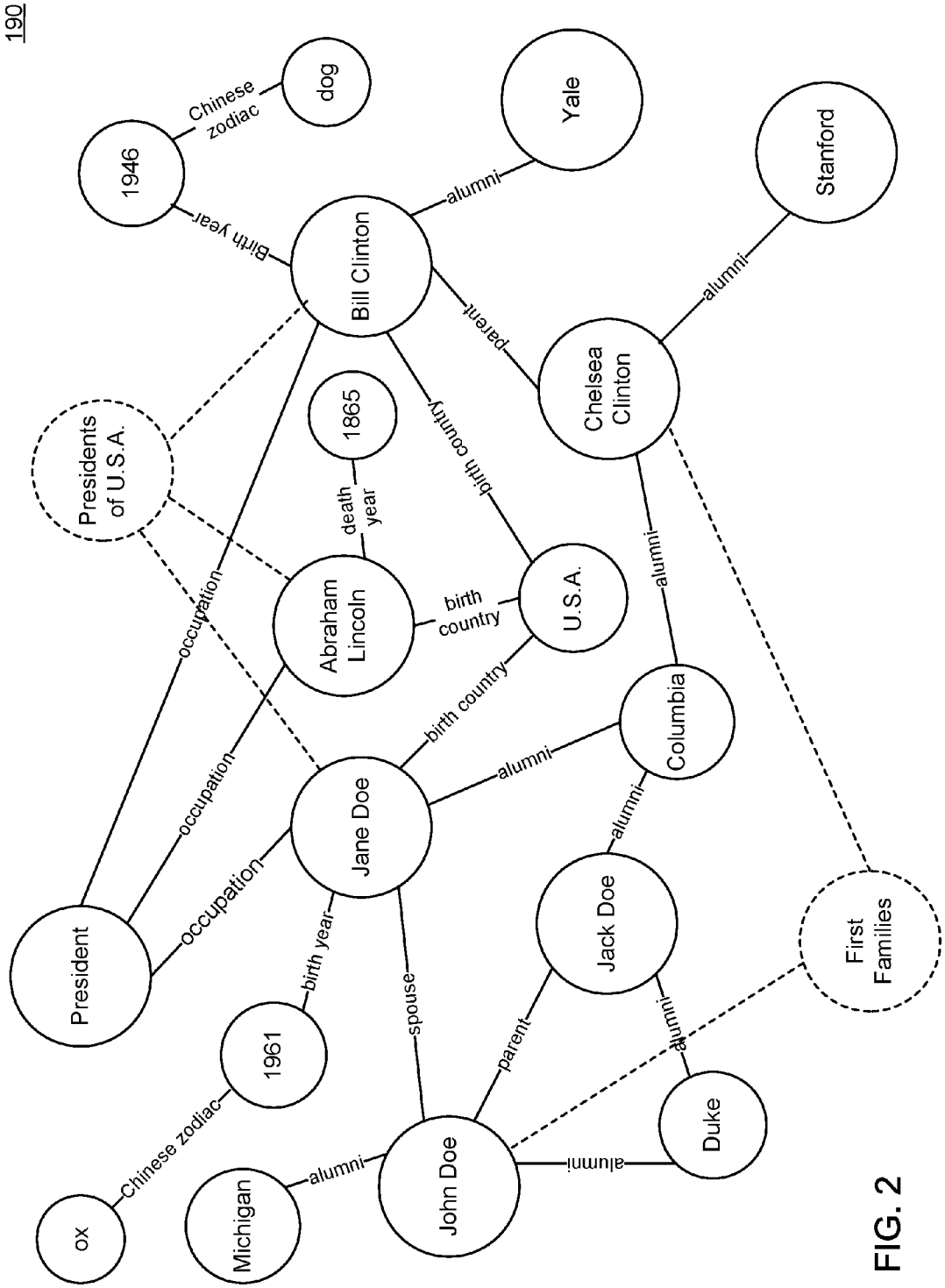
FIG. 2 illustrates a representation of an example data graph, with entities as nodes and relationships as edges between nodes.

The graph-based data store 190 may include information from which a graph, such as the graph 200 illustrated in FIG. 2, can be created. As used herein, reference to a data graph may be considered reference to the index for the data graph and vice versa. The nodes of the data graph may be referred to as entities and the edges may be referred to as relationships between two entities. As used herein, entity may refer to a physical embodiment of a person, place, or thing or a representation of the physical entity, e.g., text, or other information that refers to an entity. For example, an entity may be the physical location of France or an abstract concept that refers to France. The graph engine 110 may include a user interface that allows users, for example users of client 170, to search, update, and otherwise maintain the information in the graph-based data store 190. The graph engine 110 may also include batch or off-line processes that update the graph-based data store 190. The graph engine 110 may be a separate computing device with its own hardware processor 113 and memory 114, or it may share one or more hardware processors and memories with other components of system 100.

The system 100 may also include saved queries 140. A query is defined by a constraint expression, which may be one constraint or a Boolean expression of constraints. A constraint expression defines a query and, thus, may be referred to as a query or collection definition. The constraint expression represents conditions an entity in the graph-based data store 190 must satisfy to be considered responsive to the query and included in query results, i.e., as a member of the query results. In this sense, the query may be thought of as a collection and the entities responsive to the query members of the collection. Thus, saved queries 140 may be referred to as saved collection memberships.

A constraint is associated with a path in the graph. The path often has a length of one, but may have a longer length. The constraint may include logical operators, such as equals (==), not equals (!=), and may or may not specify a target node. Examples of a constraint with a path length of one is parent 1=NULL, meaning a node must be connected to another node by a parent edge, sibling==NULL, meaning a node must not have a sibling edge, and parent=="John Doe", which means a node must be connected to the John Doe node by a parent edge. A constraint may also include a longer path, such as alumni.parent.occupation=="President". A node meeting this constraint would be a node connected to a first target node by an alumni relationship, the first target node connected to a second target node by a parent relationship, and the second target node being connected to a President node by an occupation relationship. Constraints may be combined into a constraint expression using other logical operators, such as and (&&), or (||), etc.

The system 100 may optionally include query edge index 145. The query edge index 145 may index constraints in the saved queries 140 by edge. The query edge index 145 may improve processing time in determining which saved queries are potentially affected by an update to the graph-based data store 190, but the system 100 may also just read constraints from the saved queries 140 to determine which saved queries are potentially affected.

Figure 3:
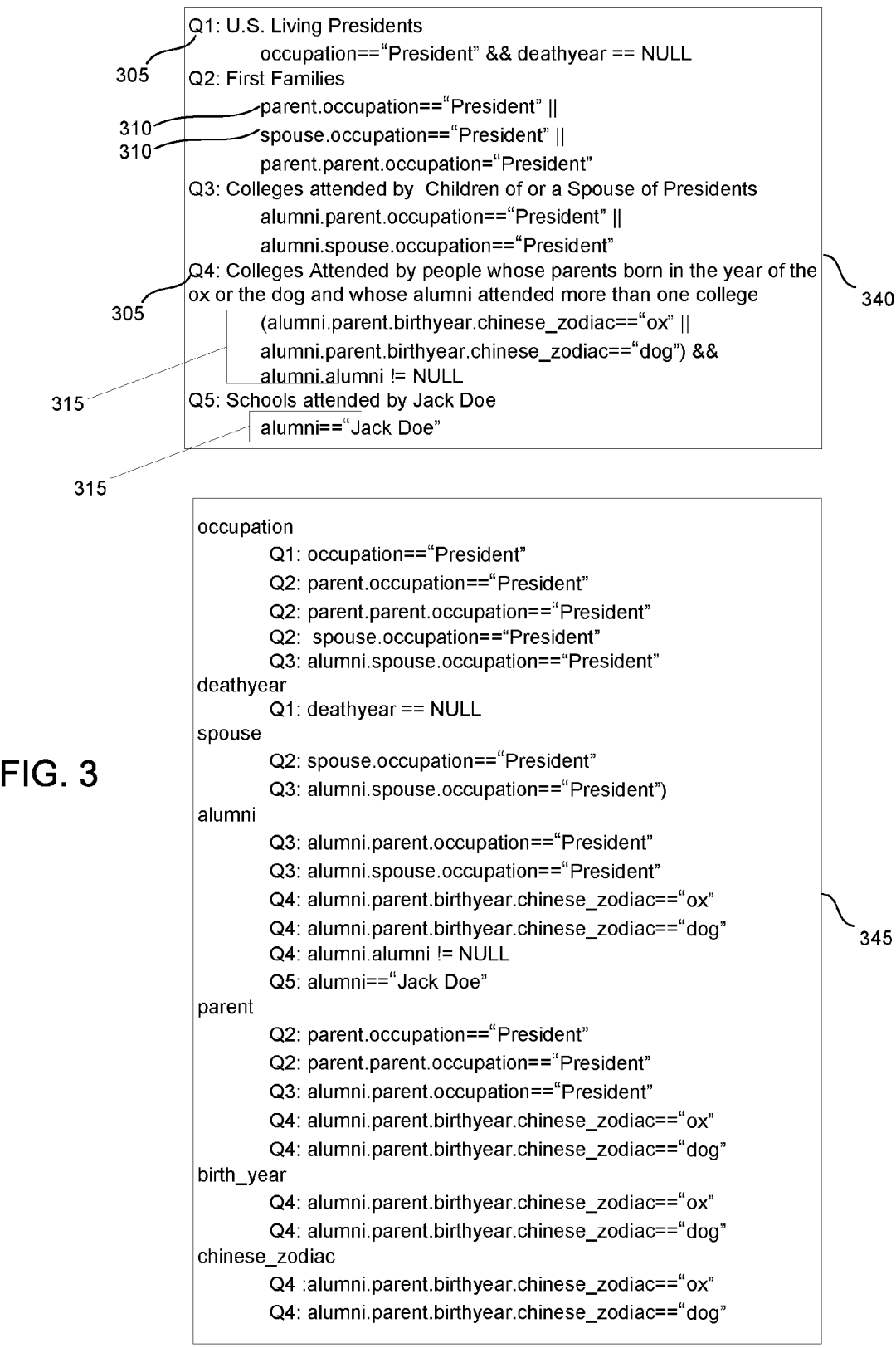
FIG. 3 illustrates an example of saved queries and a query edge index, consistent with disclosed implementations.

FIG. 3 illustrates an example of information that may be stored in saved queries 140 and a query edge index 145, consistent with disclosed implementations. The saved queries 340 may include a query identifier 305, which may include a name for the query. Each query may be defined by one or more constraints 310, which may be combined into a constraint expression 315 using logical operators. Constraints 310 may represent a path length of one, for example occupation=="President", or a longer path length, for example alumni.parent.birthyear.chinese_zodiac "ox". For an entity to be considered responsive to the query, the constraint expression 315 must evaluate to TRUE for the entity.

An example of five saved queries is illustrated in saved queries 340. Query Q1 illustrates a constraint that does not specify a target node. For example, the constraint deathyear==NULL indicates that a node meeting this constraint would not have a deathyear edge. On the other hand, if the saved query were for deceased Presidents, the constraint may be deathyear!=NULL, meaning that a node that satisfies this constraint must have a deathyear relationship with another node, but it does not matter what the node is. Query Q5 illustrates a saved query with only one constraint in the constraint expression.

FIG. 3 also illustrates example query edge index 345. The query edge index 345 is optional, and implementations may not include query edge index 345. The query edge index 345 stores the constraints for each saved query by edge. Thus, for example, there is an occupation entry in the query edge index 345. Each constraint for the occupation entry includes the query identifier for the constraint and the constraint itself. Constraints with a path length of one are, of course, associated with the edge entry that is associated with the path. Thus, the occupation=="President" constraint from query Q1 is included in the entries for the occupation edge. If the occupation edge occurs in a constraint with a longer path length, the constraint is also included with the edge entries. Thus, for example, the constraint of alumni.spouse.occupation=="President" from query Q3 is also included under the occupation entry. This constraint is also included in the entries for the alumni edge and the spouse edge. Thus, when an edge is updated (e.g., added or deleted) in the graph-based data store, the system may use query edge index 345 to quickly identify all saved queries and target constraints from the saved queries potentially affected by the update. Of course in an implementation without query edge index 345 the system may inspect the saved queries 340 to obtain the same information.

Returning to FIG. 1, the system 100 also includes saved query results 160. The saved query results 160 identify entities in the graph-based data store 190 that are responsive to the queries identified in saved queries 140. While it is not necessary for each saved query to have corresponding members in the saved query results 160, due to the length of processing time to determine query results for all nodes in a large data graph, many, if not all, queries in saved queries 140 have associated results saved in the saved query results 160. The system can thus determine membership in a query result using the entire graph-based data store 190 once and update the membership as updates to the graph-based data store 190 occur. The saved query results 160 may have various formats. As one example, each saved query may be represented as a node in the graph-based data store 190 and entities responsive to a saved query may share an edge with the node for the saved query. Thus in some implementations, the saved query results 160 may be a subset of the graph-based data store 190. Such an implementation is illustrated in the graph 200 of FIG. 2 as the First Families node and the edges connecting the node to other nodes in the graph 200. As another example, the saved query results 160 may be a file or database relating a query identifier with identifiers of nodes that are responsive to the query (e.g. a saved query result).

The graph-based data store 190, saved query results 160, saved queries 140, and query edge index 145 are stored on tangible computer-readable storage devices, for instance disk, flash, cache memory, or a combination of these, configured to store data in a semi-permanent or non-transient form. In some implementations, the graph-based data store 190, saved query results 160, saved queries 140, and query edge index 145 may be stored in a combination of various memories, and/or may be stored in a distributed manner across multiple physical or logical computing devices.

The system 100 may include a saved query engine 150. The saved query engine 150 may include one or more hardware processors 153 configured to execute one or more machine executable instructions or pieces of software, firmware, or a combination thereof to receive saved queries 140 and update the saved query results 160 as the graph-based data store 190 is updated. The saved query engine 150 may have its own processor and memory or it may share one or more processors and memories with other components of system 100. The saved query engine 150 may collect updates to the graph-based data store 190, use the updates to identify saved queries impacted by the updates, and modify the saved results (e.g., the membership) of impacted queries, if needed. To process updates to the graph-based data store 190 in an efficient manner, the saved query engine 150 may store and reuse results of graph lookups. The saved query engine 150 may store the results of previous graph lookups in temporary lookup results 147. In some implementations, the previous lookups may be stored by source node, e.g., the node from which the lookup started. A graph lookup is a forward or backward walk in the graph, starting from the source node, following all possible paths that meet the lookup criteria. Because walks in the graph can be time consuming, saving walks related to an updated edge for reuse can significantly improve the performance of the saved query engine 150 in determining updates to the saved query results 160. In some implementations, the temporary lookup results 147 may be deleted when the source node for an update changes. Thus, in an implementation where the system groups updates by source node, the previous lookups can be used across updates. In some implementations, the saved query engine 150 may include a saved query user interface (UI) that receives query definitions, for example from a client 170. The saved query engine 150 may use the graph-based data store 190 to determine saved query results for the newly entered saved query in an offline manner.

The system 100 may also include other components not illustrated for brevity. For example, the system 100 may include an indexing engine to create and maintain graph-based data store 190. The indexing engine may obtain content from, for example, one or more servers, and use the content to maintain graph-based data store 190. In some implementations, the servers may be web servers, servers on a private network, or other sources that are accessible by the indexing engine. The indexing engine may be one or more separate computing devices and, in some implementations, the graph engine 110 may include an indexing engine for the graph-based data store 190. The system 100 may also include a search engine that uses the graph-based data store 190 to determine search results for queries using conventional or other information retrieval techniques. In some implementations, the search engine may also use saved query results 160 to determine search results.

The system 100 may be in communication with the client(s) 170 over network 180. Network 180 may be for example, the Internet or the network 180 can be a wired or wireless local area network (LAN), wide area network (WAN), etc., implemented using, for example, gateway devices, bridges, switches, and/or so forth. Via the network 180, the graph engine 110 and/or the saved query engine 150 may communicate with and transmit data to/from clients 170.

Figure 4:
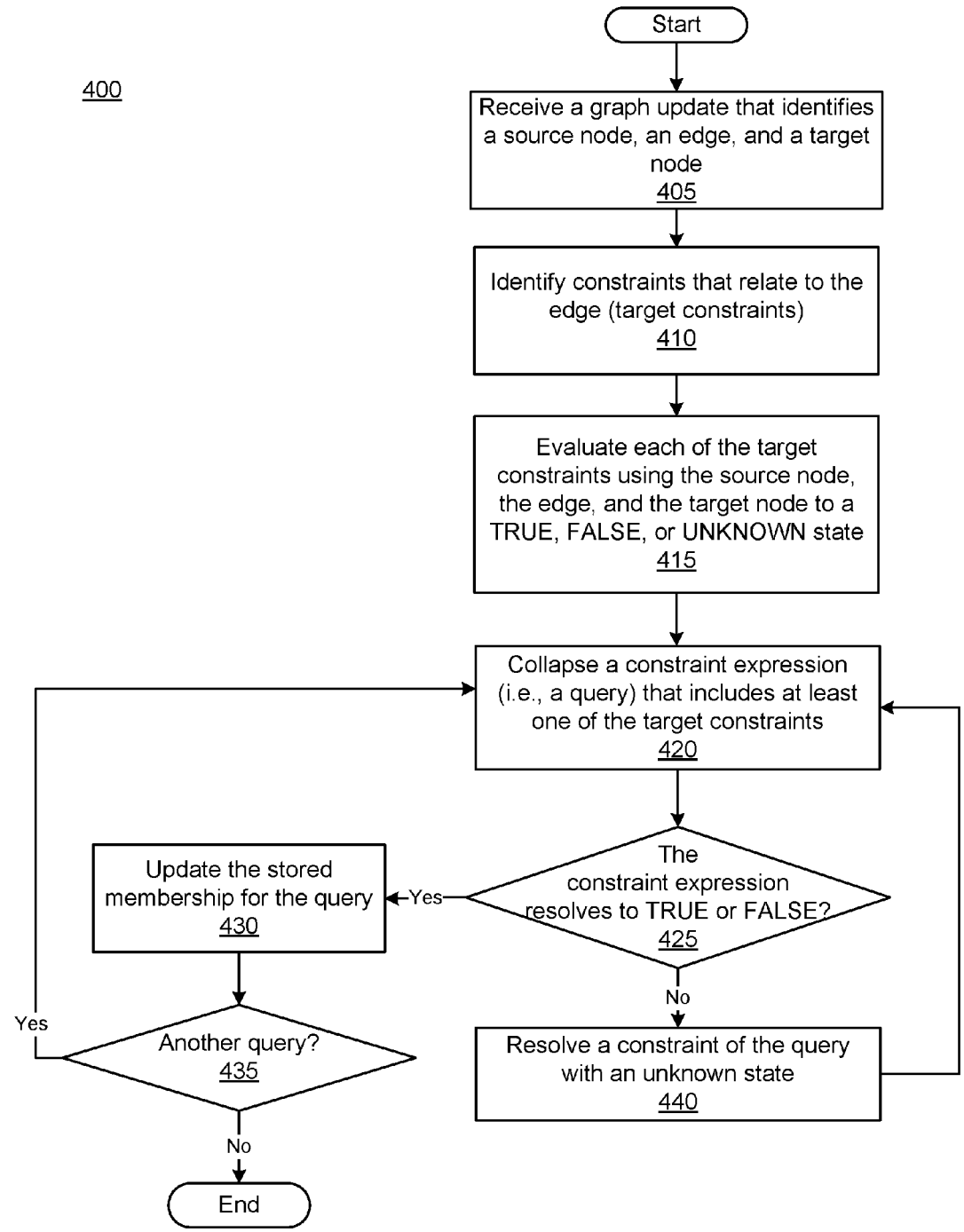
FIG. 4 illustrates a flow diagram of an example process for efficiently updating query membership in real-time, consistent with disclosed implementations.

FIG. 4 illustrates a flow diagram of an example process 400 for efficiently updating saved query results in real-time, consistent with disclosed implementations. The process 400 may be performed by a system, such as system 100 of FIG. 1. The system may use process 400 to update saved query results in real-time, as updates occur to the graph-based data store, rather than waiting for a periodic batch or offline update process. This enables the system to avoid staleness in the stored query memberships. In some implementations, process 400 may be performed by a saved query engine.

Process 400 may begin with the system receiving a graph update that identifies a source node, an edge, and a target node (405). In some implementations, the system may receive several graph updates and group the updates by source node, so that all updates involving the same source node are grouped together. For example, rather than running immediately after an update to the graph occurs, the system may have a short delay, for example up to one minute, in which to collect updates. This way the system can take advantage of several updates that involve the same source node. The system may select one or more of the updates in the grouped updates for processing. For example, for updates that involve the same source node the system may perform process 400 in parallel. The system may then identify constraints potentially affected by the update, also referred to as target constraints (410). A target constraint is a constraint specifying a path that includes the edge identified in the updated triple.

Once the system has identified target constraints (e.g., constraints that identify the edge in the update to the graph), the system may determine a state for each of the target constraints (415). The state of a constraint is TRUE, FALSE, and UNKNOWN. A state of TRUE indicates that there is at least one way of satisfying the constraint in the graph-based data store. For example, if a node in the graph-based data store satisfies the constraint using the added edge or satisfies the constraint even after the edge is deleted the constraint is satisfied. As another example, if the constraint is a negation, the absence of a subgraph despite an added edge may satisfy the constraint. In the case of a constraint with a backward lookup (e.g., the source node of the added edge is an intermediate node in the constraint), the backward lookup may mean that the constraint has a state of TRUE for more than one node. This will be explained in more detail with regard to FIGS. 7 and 8. A state of FALSE for an edge means that the updated edge does not satisfy the constraint. A state of UNKNOWN indicates that additional lookups are needed. The system may defer a graph-lookup for a constraint that has multiple hops for efficiency, e.g., if the constraint is one of a string of constraints connected by OR operators and other constraints have shorter paths or saved lookup results. Because multi-hop graph lookups are expensive, deferring longer graph lookups in longer-path constraints when the constraints are disjunctively combined with shorter-path constraints may save processing time. For example, query Q2 includes three constraints combined disjunctively (e.g., with the OR operator). The first two constraints involve a path length of two, while the last involves a path length of three. If the source node of the added edge causes the first constraint to be TRUE, a lookup of the longer path is not needed. Thus, the system may set the state of the constraint with the longer path to UNKNOWN and only perform the lookup if the graph lookup fails to match one of the first two constraints. In some implementations, the system may use an intelligent selection process, such as process 500 of FIG. 5 or process 600 of FIG. 6.

Once the target constraints have been evaluated and assigned a state, the system may look up the query definition for a saved query for at least one of the target constraints and collapse the constraint expression for the query (420). For example, query Q2 of FIG. 3 has three constraints in its constraint expression. If the parent.occupation=="President" constraint is a target constraint with a state of TRUE for a Jack Doe node, the system would substitute the state of the first constraint for the first constraint in the constraint expression, and determine if the constraint expression could be resolved. For example, collapsing the query definition of C2 using the example above would look like (TRUE||spouse.occupation=="President"||parent.parent.occupation=="President). The collapsed query definition of C2 resolves to TRUE because one constraint in a disjunction of constraints is TRUE.

The system may determine whether the collapsed constraint expression resolves to TRUE or FALSE (425). As demonstrated above, this may occur when one constraint in series of disjunctive constraints is TRUE. In this case, the system does not need to evaluate other constraints because one constraint having a TRUE state is enough to make the constraint expression TRUE. Likewise, if one constraint in a series of conjunctive constraints is FALSE, the system need not evaluate the other constraints. If the constraint expression does not resolve to either TRUE or FALSE (425, No), the system may select one or more of the unresolved constraints in the constraint expression and determine a state for the unresolved constraints (440). In some implementations, the system may use an intelligent selection process, such as process 500 of FIG. 5 or process 600 of FIG. 6. The system may then collapse the constraint expression (420) using the state(s) determined for one or more of the constraints. Steps 420 to 440 thus represent an iterative evaluation of constraints, graph lookups, and collapsing the constraint expression to determine which nodes may be members of the query results affected by the graph update. Such an iterative process allows the system to perform minimal lookups in the graph, the reducing the processing time spent determining which saved query results are affected by a graph update.

If the constraint expression resolves to either TRUE or FALSE (425, Yes), the system may update the stored membership for the query (430). To update membership for an added edge where the constraint expression resolves to TRUE, the system may add the appropriate source node(s) to the saved query results if the source node(s) do not already exist in the saved results for the query. To update membership for a deleted edge where the constraint expression resolves to FALSE, the system may remove the appropriate source node(s) from the saved query results, if they exist in the saved query results. Otherwise, the system may maintain the query results or, in other words, leave the query results as they are because the results are unaffected by the updated triple.

If there are other queries with target constraints (435, Yes), the system may select another query for one or more of the remaining target constraints and repeat steps 420 to 440 for that query. Otherwise, process 400 ends, the system having updated affected saved query results in response to updates to the graph.

Figure 5:
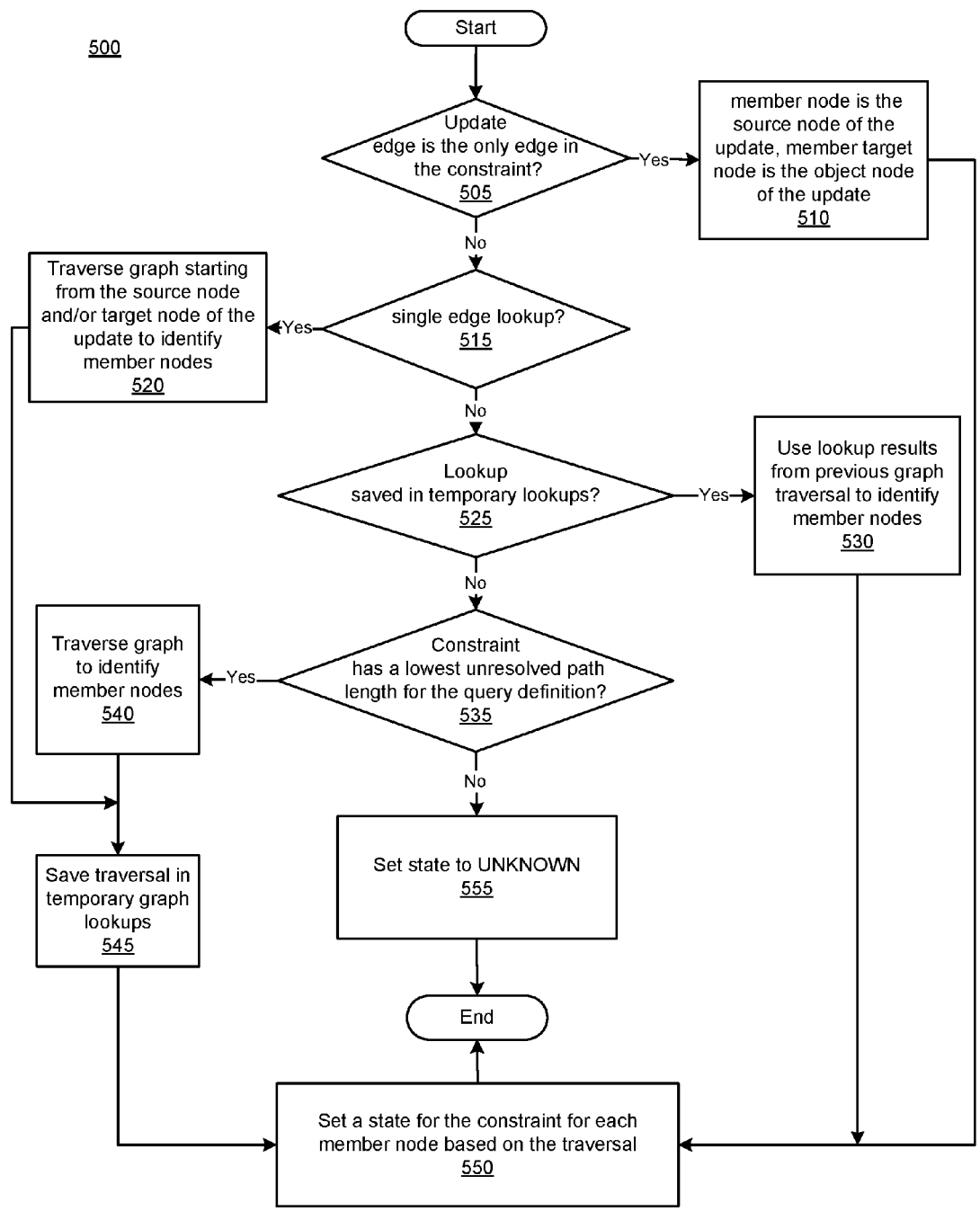
FIG. 5 illustrates a flow diagram of an example process for intelligently evaluating constraints after an edge is added to the graph, consistent with disclosed implementations.

FIG. 5 illustrates a flow diagram of an example process 500 for intelligently selecting and evaluating constraints after an edge is added to the graph, consistent with disclosed implementations. The process 500 may be performed by a saved query engine of a system as part of step 415 or 440 of FIG. 4. The system may use process 500 to intelligently select constraints for evaluation and to reuse graph traversals performed for other constraints to more efficiently determine changes to saved query results after an update to the graph-based data store. The system may run process 500 for a constraint in a constraint expression for a query that has at least one target constraint. Process 500 may begin by determining whether the update edge is the only edge in the constraint (505). In other words, if the edge in the graph update matches the only edge in the constraint (505, Yes), the system need not perform any graph lookup and can set the member node to the source node of the update and the member target node to the object node of the update (510). A member node is a node that is a potential member of the set of nodes in the query results that includes the constraint being evaluated. The member target node is a node that is reached from the member node via the path specified in the constraint. In a constraint with a single edge, the source node of the updated triple is the member node and the target node of the updated triple is the member target node, because any other nodes reached from the source node of the updated triple via the edge of the updated triple are not affected by the update. In other words, the membership doesn't change and it is not necessary for the system to re-verify this membership. Similarly, if the edge in the update is the first edge in a constraint with a path length longer than one, the source node of the update is still the only potential member node because any graph lookups will only include forward walks in the graph from the source node in the update. In this situation, the target node of the updated triple is not the member target node. Member target nodes in this situation are identified by traversing the graph from the object node via the path specified in the constraint to one or more target member nodes. If the system is unable to reach at least one member target node following the path specified in the constraint, the member target node for the member node is NULL, meaning that the graph does not include a path from the member node to any other node that matches the path in the constraint.

Member nodes are not always the source node of the added triple. For example, when the edge in the added triple is not the first edge in a path of the constraint, the graph lookup will involve a backward walk from the source node of the updated triple, and the member nodes will be one or more nodes reached on the backward walk. Member target nodes in such a situation will be nodes reached from the member nodes via the added triple, as will be explained in more detail below.

The system may set the state of the constraint for each member node based on the traversal (550). Whether or not the member node satisfies the constraint depends on the member target node (or nodes) identified for the member node. For example, if the member node is associated with at least one member target node that satisfies the constraint, the state of the constraint is TRUE for that member node, otherwise it is FALSE. By design, the member target nodes are nodes reached from the member node via the graph update (e.g., the source, edge, and target node of the graph update). This may result in the system traversing to zero, one, or more member target nodes per member node. As long as one member target node matches the constraint conditions, the state of the constraint for the member node is TRUE. Once the system sets the state of a constraint, process 500 ends for that constraint.

If the update edge is not the only edge in the constraint (505, No), the system may determine whether the constraint includes single edge lookups (515). A single edge includes a constraint where the edge of the update is part of a constraint with a path length of two. For example, if the graph update is <Jack Doe, parent, Jane Doe> and the constraint is alumni.parent=="Jane Doe", the system may consider this a single edge lookup because only the alumni edge needs to be traversed backward to find member nodes. In such an example, the member target node is "Jane Doe" and no forward traversal is needed. Likewise, if the constraint is parenLoccupation=="President" the system may consider this a single edge lookup because the member node is Jack Doe and only a forward lookup from Jane Doe via the occupation edge is needed to identify member target node(s). If no occupation edge exists for Jane Doe the system may set the member target node to NULL. Additionally, if the edge of a graph update is the middle edge of a constraint with a path length of three, the system may consider this a single edge, e.g., a single backward edge and a single forward edge. For example, if the constraint is alumni.parent.occupation=="President" and the added triple is <Jack Doe, parent, Jane Doe>, the added triple fulfills the middle edge in the constraint and the system may traverse one edge from Jane Doe via the occupation edge to determine potential target member nodes and traverse the graph from the Jack Doe node via the alumni edge to determine member nodes. Accordingly, if the constraint is a single edge lookup (515, Yes), the system may traverse the graph to identify member nodes and target member nodes (520), as just described. In some implementations, the system may save the results of a lookup in a temporary lookup table (545). This will enable the system to re-use the results of the lookup in future evaluations of other constraints.

The system may set the state of the constraint for each member node based on the traversal (550). For example, if the traversal of the graph starting with a member node indicates the edge does not exist for the member node, and the constraint includes an ==NULL condition, the system may set the state to TRUE for the member node. If the constraint includes a !=NULL condition, the system may set the state to FALSE for that member node. If the constraint specifies a specific node as the target node and the member target node(s) do not match the node specified in the constraint, the system sets the state for the member node to FALSE, and to TRUE otherwise. For example, if the constraint includes an =="President" condition and the target member node(s) do not include the President node, the system may set the state to FALSE. If the target member node(s) do include the President node, the system may set the state to TRUE. The system may pair the member node with the appropriate state, so that it can track which member nodes satisfy the constraint. Process 500 then ends for the constraint.

If the constraint does not include a single lookup (515, No), the system may determine whether the constraint includes a path with stored lookup results (525). For example, the system may temporarily store results from previous graph lookups, for example in a data store such as temporary lookup results 147 of FIG. 1. This enables the system to reuse work performed for a previous constraint. This is especially efficient when the system groups updates by source node, so that saved lookups can be used across multiple updates to the graph. The saved lookups may include the source node, the path followed, and any target nodes arrived at via the path.

If the constraint includes a path having a corresponding saved lookup result (525, Yes), the system may use the saved lookup results to determine member nodes and member target nodes for the constraint (530). As indicated above, member nodes are the nodes that are nodes that can potentially satisfy the constraint and, thus, are potentially responsive to the query (e.g., potential members of the set of nodes in the saved query results). Each saved lookup result may include a source node and any target nodes reached via the saved path from the source node. The source nodes in the saved lookups may be member nodes or may be used to determine member nodes, depending on the constraint. For example, if the graph update is <Bill Clinton, occupation, President>, and the constraint being evaluated is alumni.parent.occupation=="President" and the saved lookups includes a backward lookup from Bill Clinton via a parent edge, Chelsea Clinton may be the target node saved in the temporary lookup results. Thus, when evaluating the constraint alumni.parent.occupation, the system may only need to evaluate the path from Chelsea Clinton via the alumni path to determine the member nodes, e.g., Columbia and Stanford using the example graph of FIG. 2. On the other hand, if the constraint being evaluated is parent.occupation, then the target node Chelsea Clinton that is in the saved lookups for Bill Clinton->parent is the member node. When traversing the graph, the system may need to perform a forward and a backward walk, as described above with regard to single edge lookups in step 515. The forward and backward walks may themselves include more than a single lookup. In some situations the constraint may include a backward walk that is saved and a forward walk that is not, or vice versa. Thus, using the saved lookup results from a previous graph walk may include additional graph lookups to determine either member nodes or member target nodes, depending on which walk is saved. The system may set the state of the constraint for each member node identified, based on the traversal (550), as described above.

If the constraint does not include a saved lookup (525, No), the system may determine if the constraint has a lowest unresolved path length for the query definition (535). For example, query Q4 of FIG. 3 includes two constraints with a path length of five and one constraint with a path length of three. In some implementations, the system may use the structure of the constraint expression to determine if the constraint has a lowest unresolved path length for a particular portion of the constraint expression. Thus, for example, if the expression is a disjunctive series of constraints the system may determine whether the constraint has a lowest path length of the constraints in the series of constraints. If process 500 is invoked when evaluating target constraints only (e.g., step 415 of FIG. 4), the system may determine if the constraint is the shortest path length of the target constraints for a saved query, rather than the full query definition. If the system determines that the constraint has lowest path length (535, Yes), the system may traverse the graph to identify member nodes and their respective member target node(s), if any. As described above, this may include both a forward walk in the graph and a backward walk. The system may save the results of the lookup(s) made during the traversal (545) so that the results can be reused. The system may set the state of the constraint for each member node (550), as previously described.

If the system determines the constraint does not have a lowest path (535, No), the system may set the state of the constraint to UNKNOWN (555). This means that the system will wait to evaluate the constraint at a later time, if such an evaluation is needed. In this manner the system may put off more complex traversals if such traversals are not necessary to resolve the responsiveness of a particular member node to a saved query.

Process 500 as illustrated in FIG. 5 is one example of intelligently evaluating constraints. Of course, in some implementations, the system may fully evaluate each constraint as it is encountered, saving the results of any graph traversals as needed. In such implementations, the system may use saved lookups, if available (e.g., step 525 and 530), and otherwise traverse the graph (e.g., step 540) and save the results of the traversal (545), never setting a state to UNKNOWN. In addition, it may apparent from this disclosure that other variants may be used in optimizing constraint evaluation, e.g., always performing lookups with a length of two instead of just single lookups as part of step 515, etc. Furthermore, it is understood that in some implementations, setting the status of the constraint for a member node (step 550) may be performed as part of identifying the member nodes and/or the member target nodes. Thus, the order of the steps illustrated in FIG. 5 is exemplary only and implementations are not limited to the order illustrated.

Figure 6:
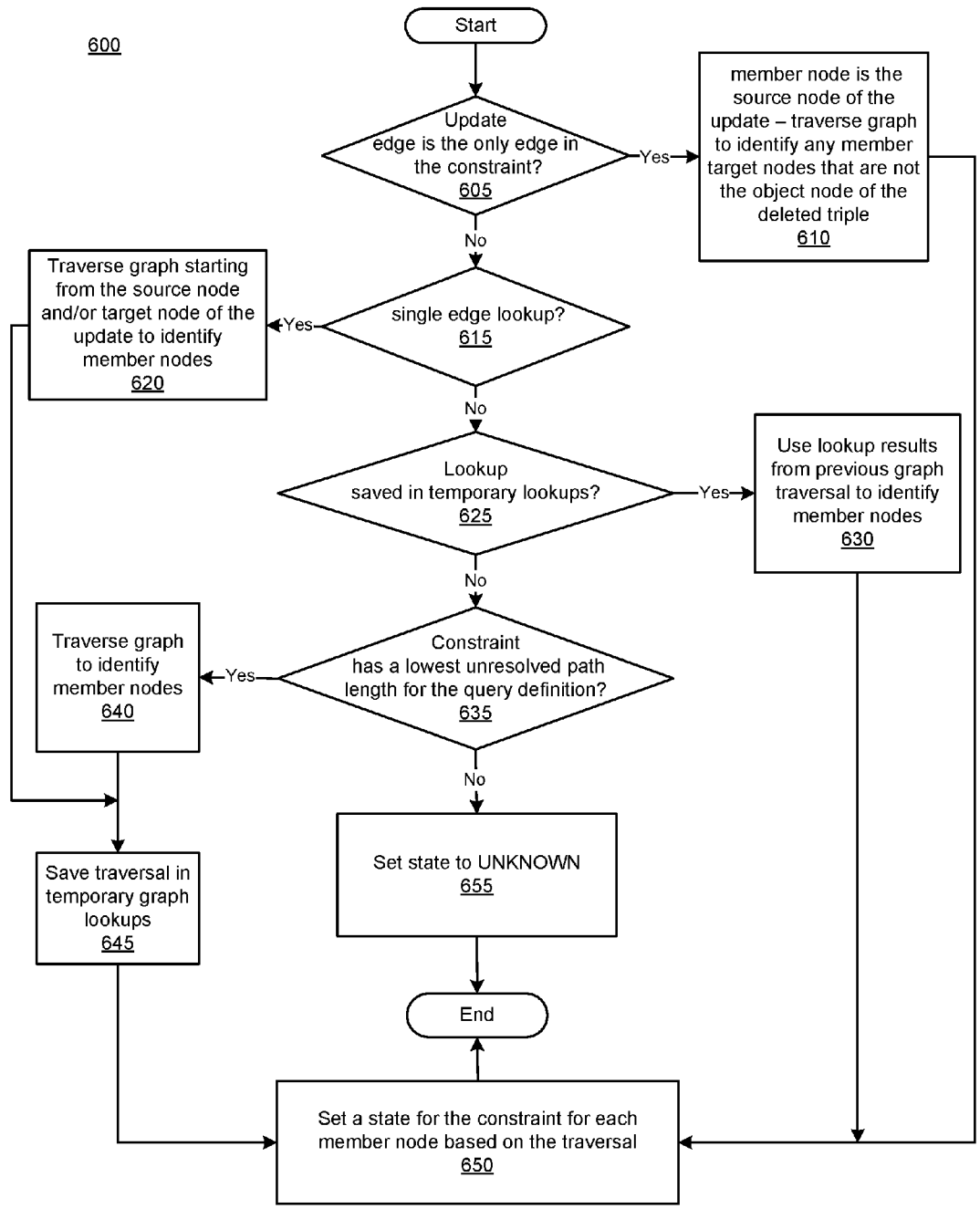
FIG. 6 illustrates a flow diagram of an example process for intelligently evaluating constraints after an edge is deleted from the graph, consistent with disclosed implementations.

FIG. 6 illustrates a flow diagram of an example process 600 for intelligently selecting and evaluating constraints after an edge is deleted from the graph, consistent with disclosed implementations. The process 600 may be performed by a saved query engine of a system as part of step 415 or 440 of FIG. 4. The system may use process 600 to intelligently select constraints for evaluation and to reuse graph traversals performed for other constraints to more efficiently determine changes to saved query results after an update to the graph-based data store. The system may run process 600 for a constraint in a constraint expression of a saved query that has at least one target constraint. Process 600 may begin by determining whether the deleted edge is the only edge in the constraint (605). In other words, if the edge in the graph update matches the only edge in the constraint (605, Yes), the system can set the member node to the source node of the deleted edge and look for member target nodes (610). Unlike an added triple, the target node of the deleted triple is not a valid member target node because the edge no longer exists in the graph. Thus, the system may traverse the graph from the member node (e.g., the source node from the deleted triple) to determine if it is connected to another node by an edge that matches the constraint edge. For example, if the deleted triple is <Jack Doe, parent, John Doe> and the constraint is parent!=NULL the system may determine whether there is another parent edge from Jack Doe to a node besides John Doe. If there is, the other node is the member target node. The system may set the state of the constraint for the member node based on the traversal (650). As with an addition to the graph, whether or not the member node satisfies the constraint depends on the member target node (or nodes) identified, or the failure to identify a member target node, for the member node. Continuing the example above, if the member node is not associated with at least one other node via a parent relationship, the member target node is NULL and the constraint parent!=NULL is not satisfied and would receive a state of FALSE. Once the system sets the state of a constraint, process 600 ends for that constraint.

If the update edge is not the only edge in the constraint (605, No), the system may determine whether the constraint includes single edge lookups (615). Like an added triple, a single edge for a deleted triple includes a constraint where the edge of the deleted triple is part of a constraint with a path length of two. But unlike an added triple, a constraint where the edge of the deleted triple is the middle edge of a constraint is not a single edge lookup. This is because the deleted triple no longer fulfills the middle edge requirement. Instead, the system needs to perform a backwards lookup to identify all the potential member nodes (if any) and do a forward lookup, following the path prescribed by the three edges, to determine any possible member target nodes. Thus, a forward lookup of at least three edges is required and such a constraint may not satisfy the single edge lookup. If the constraint is a single edge lookup (615, Yes), the system may traverse the graph to identify member nodes and target member nodes (620), as just described. In some implementations, the system may save the results of a lookup in a temporary lookup table (645). This will enable the system to re-use the results of the lookup in future evaluations of other constraints. The system may set the state of the constraint for each member node based on the traversal and the member target nodes identified (650). The system may pair the member node with the appropriate state, so that it can track which member nodes meet the constraint. Process 600 then ends for the constraint.

If the constraint does not include a single lookup (615, No), the system may determine whether the constraint includes a path with stored lookup results (625). For example, the system may temporarily store results from previous graph lookups, for example in a data store such as temporary lookup results 147 of FIG. 1. This enables the system to reuse work performed for a previous constraint and is especially efficient when the system groups updates by source node, so that saved lookups can be used across multiple updates to the graph. The saved lookups may include the source node, the path followed, and any target nodes arrived at via the path. The system may delete any saved lookups when the source node of the graph updates changes.

If the constraint includes a saved lookup (625, Yes), the system may use the target nodes of the saved lookup to determine member nodes and member target nodes for the constraint (630), as discussed above with regard to FIG. 5, except that the deleted edge cannot be used to traverse the graph. The system may set the state of the constraint for each member node identified and the member target node(s), based on the traversal (650), as described above.

If the constraint does not include a saved lookup (625, No), the system may determine if the constraint has a lowest unresolved path length for the query definition (635), as described above with regard to FIG. 5. If the system determines that the constraint has lowest path length (635, Yes), the system may traverse the graph to identify member nodes and member target node(s), as appropriate as described above with regard to FIG. 5, except that the traversal includes doing any backward walk first to identify member nodes and doing a forward walk from each member node using the path specified in the constraint to identify potential member target nodes. Of course, when more than one member node exists for a constraint, it is possible for the constraint to have a state of TRUE for one member node and a state of FALSE for another member node. The system may save the results of the backward and forward lookup(s) made during the traversal (645) so that the results can be reused. The system may set the state of the constraint for each member node (650), as previously described.

If the system determines the constraint does not have a lowest path (635, No), the system may set the state of the constraint to UNKNOWN (655). This means that the system will wait to evaluate the constraint at a later time, if such an evaluation is needed. In this manner the system may put off more complex traversals if such traversals are not necessary to resolve the responsiveness of a particular member node to a saved query.

Similarly to process 500, process 600 as illustrated in FIG. 6 is one example and implementations may combine steps, reorder steps, perform only some steps, etc., and implementations are not limited to the order or the steps illustrated.

Figure 7:
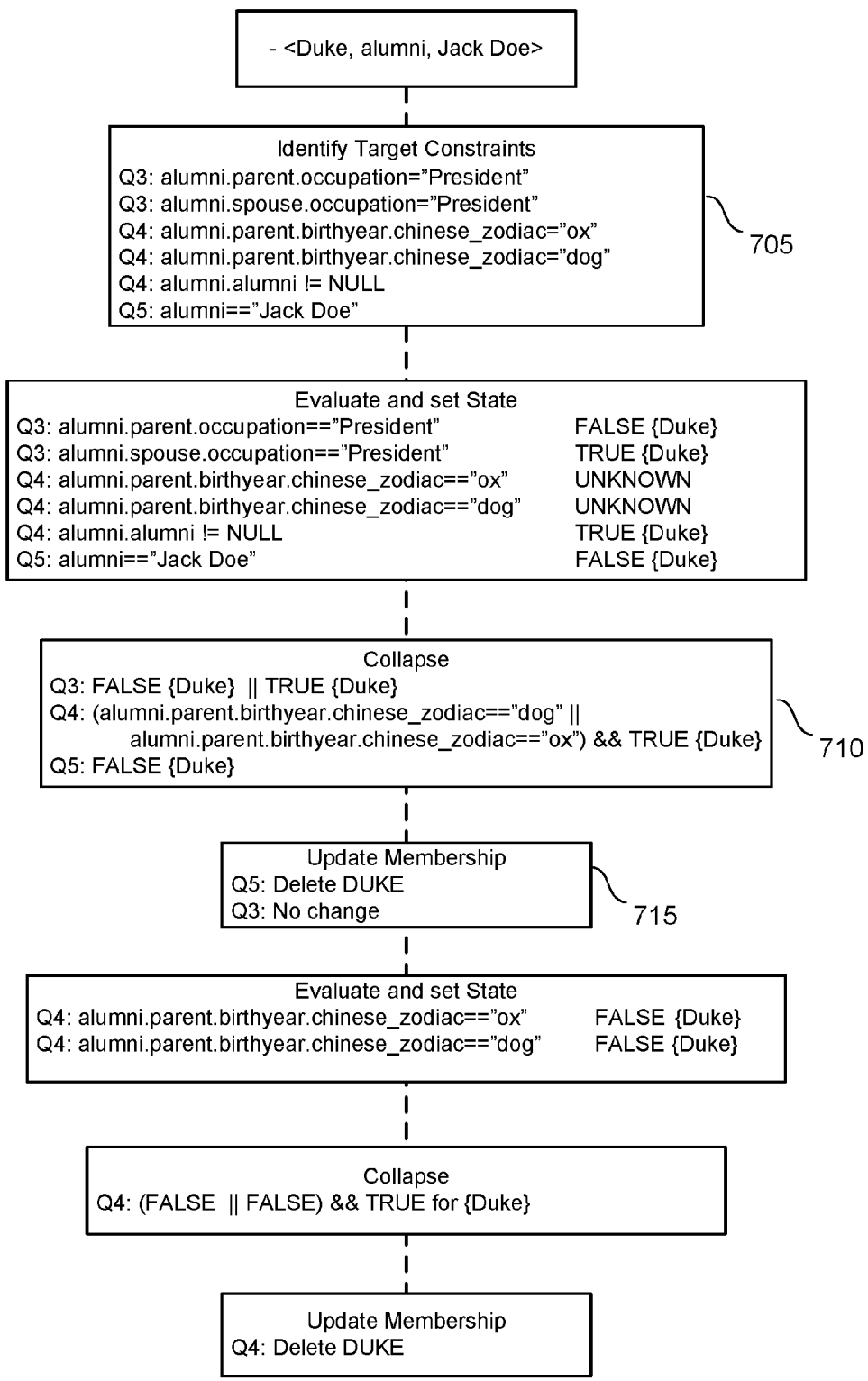
FIG. 7 illustrates an example of updating query membership in real-time after deleting an edge in the data graph of FIG. 2.
Figure 8:
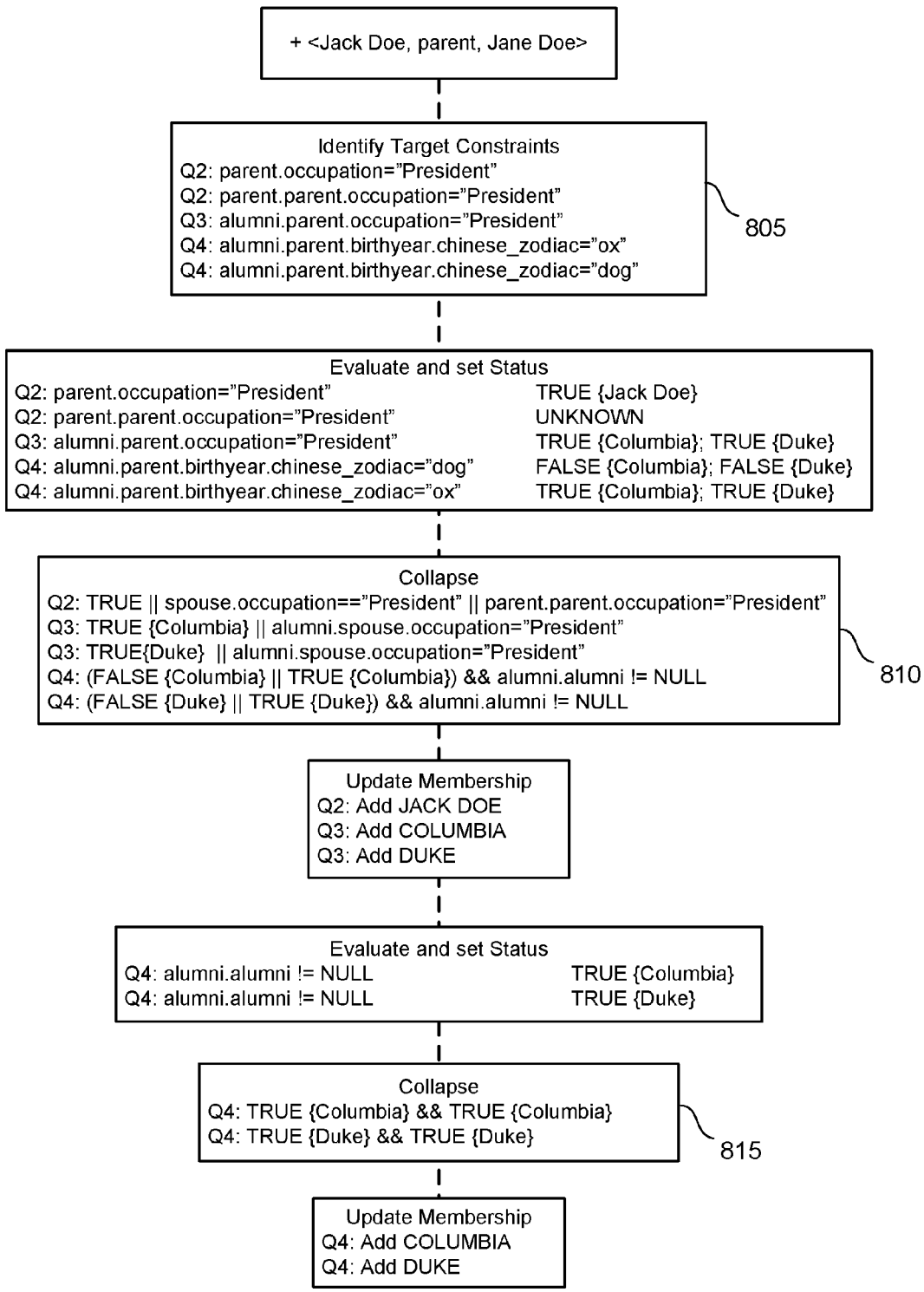
FIG. 8 illustrates an example of updating query membership in real-time after adding an edge in the data graph of FIG. 2.

FIGS. 7 and 8 illustrate an example of updating query membership in real-time using the data graph of FIG. 2 and the example saved queries 340 of FIG. 3. In the example of FIG. 7 the triple <Duke, alumni, Jack Doe> of FIG. 2 is deleted from the graph 200. Thus, the updated triple is <Duke, alumni, Jack Doe>. In some implementations the system may update saved query results affected by the deletion in response to the update, and in some implementations the system may group updates that occur in a short period of time, for example less than 5 minutes, and then update saved query results based on the group of updates. Grouping may be done by source node of the updated triple. In either implementation, the update triggers the process of updating the saved query results. Thus, the saved query results occur in real-time.

After receiving deleted triple, the system may identify target constraints. As indicated above, target constraints are constraints that include the edge identified by the deleted triple. In some implementations, the system may use an index, such as query edge index 345 of FIG. 3 to identify target constraints. For example, using the index 345 the system may find an entry for the alumni edge in the index and identify the entries for the alumni edge as target constraints. In some implementations, the system may read the saved queries 340 and look for constraints that include the alumni edge. Based on the graph 200 of FIG. 2 and the saved queries 340 and, optionally, the query edge index 345, the system may identify the target constraints 705. The system may then evaluate the target constraints. In some implementations, the system may intelligently evaluate the constraints. For example, the two constraints for query Q3 each have a path length of three—thus, they are each a shortest path length for the target constraints of query Q3 and the system may traverse the graph to determine member nodes and a state of the constraint for each member node. Because the edge of the deleted triple is alumni and alumni is the first edge of each target constraint in query Q3, the member node is Duke, the source node of the deleted triple. Thus, traversing the graph for these constraints involves a forward walk in the graph from the Duke node.

Using the graph of FIG. 2, the Duke node includes only one alumni edge now that the <Duke, alumni, Jack Doe> edge is deleted. Thus, in evaluating the first constraint the system follows the alumni to the John Doe node. The John Doe node has a parent relationship with the Jack Doe node, but the Jack Doe node does not have an occupation edge. Thus, the system assigns the member target node to NULL. Because the constraint alumni.parent.occupation=="President" indicates that the condition for membership is a member target node of President, the member target node of NULL fails to satisfy the constraint, so the system sets the state of the constraint to FALSE for the Duke member node. It is understood that the graph of FIG. 2 is an undirected graph. In some implementations the graph may be directed, for example the parent edge may lead only from the child node to the parent node (e.g., only from Jack Doe to John Doe). In such a graph, the system would not see a parent relationship leading out from the Jack Doe node, which would still result in a member target node of NULL and a state of FALSE for this constraint.

The system may then evaluate the second constraint for query Q3. The Duke node has an alumni relationship with the John Doe node, which has a spouse relationship with the Jane Doe node. The Jane Doe node has an occupation relationship with the President node, making the member target node President for the member node of Duke. Because the member target node of President matches the condition in the constraint, the system sets the state of the constraint alumni.spouse.occupation=="President" to TRUE for the Duke member node.

The system may also evaluate the target constraints for the query Q4. The target constraints include two constraints with a path length of five and one with a path length of two. The system may select the alumni.alumni!=NULL constraint for evaluation, and set the state of the remaining two target constraints to UNKNOWN because their path length is longer. Because the alumni relationship is the first relationship in the path of the constraint alumni.alumni!=NULL the system may set the member node to Duke, the source node of the deleted triple. The system may walk the graph and determine that the Duke node has an alumni relationship with another node—the John Doe node. In some implementations the system may use a saved graph lookup to determine that this relationship exists. The John Doe node has an alumni relationship with the Michigan node. Thus, the member target node is Michigan. Because the member target node is not NULL, the constraint is satisfied and the system sets the state of the constraint for the Duke node to TRUE.

Finally, the system may evaluate the target constraint for query Q5. This constraint only has one edge, so the system may traverse the graph from the Duke node to the John Doe node via the alumni edge. This is the end of the path, so the John Doe node is the member target node. Because the member target node is not "Jack Doe", as specified by the constraint, the system sets the state for this constraint to FALSE for the Duke member node.

The system may collapse the various query definitions by substituting the state of the constraints for the constraint in the query definition. This results in the collapsed definitions 710 of FIG. 7. The system can evaluate the collapsed definitions to determine if the constraint expression evaluates to TRUE or FALSE, or if additional lookups are needed. As illustrated in FIG. 7, the constraint expression for query Q3 resolves to TRUE for Duke and the constraint expression for query Q5 resolves to FALSE for Duke. The constraint expression for query Q4 does not resolve yet because additional lookups are needed. It is noted that if the alumni.alumni!=NULL constraint had evaluated to FALSE, no additional lookups would be needed because the collapsed constraint expression for C4 would resolve to FALSE.

The system may update the saved query results for resolved queries at 715. Because query Q5 resolved to FALSE, and this is deletion of a triple, the Duke node should be removed from the Q5 query. Because query Q3 resolved to TRUE, and this is a deletion of a triple, no changes are needed (e.g., the deletion did not affect the membership) and the system may maintain the membership for the saved results of query Q3. Although FIG. 7 illustrates the evaluation, collapse, and update steps operating over groups of constraints in different saved queries, it is understood that in some implementations the system may evaluate, collapse, and update membership one query at a time. For example, the system could evaluate the constraints for query Q3, collapse the query definition for Q3, and then update the membership of Q3 before evaluating the constraints of Q4, collapsing the query definition of Q4, etc. Thus, implementations are not limited to the sequence demonstrated in FIG. 7.

Because query Q4 has not been resolved yet, the system may evaluate the constraints with an UNKNOWN state or constraints that were not target constraints in the query. In the example of FIG. 7, there are two constraints to evaluate, each with the same path length. The system may, thus, begin a walk in the graph from the Duke node following the path identified in the alumni.parent.birthyear.chinese_zodiac=="ox" constraint. Because no such path exists in the graph of FIG. 2 with the deletion, the member target node is NULL, which does not satisfy the constraint, and the system sets the state of the constraint to FALSE for the Duke member node. The system may have saved the results of the lookup, e.g., indicating that such a path does not exist, and the system may reuse those results to determine that the alumni.parent.birthyear.chinese_zodiac "dog" constraint is also not satisfied for the Duke node. Thus, the system may also set the state of this constraint to FALSE for the Duke node. The system may then collapse the query definition and determine that it evaluates to FALSE. Because it evaluates to FALSE and the update is a deleted triple, the system may delete the Duke node from the Q4 saved query results. The system has now updated the saved query results affected by the deletion of the triple, and may move on to process a next triple in a group, or may wait for another update to the data graph.

In the example of FIG. 8 the triple <Jack Doe, parent, Jane Doe> has been added to the graph 200 of FIG. 2. Thus, the updated triple is <Jack Doe, parent, Jane Doe>. In some implementations the system may update saved query results affected by the addition in response to the update, and in some implementations the system may group updates that occur in a short period of time, for example less than 5 minutes, and then update saved query results based on the group of updates. Grouping may be done by source node of the updated triple. The example of FIG. 8 uses the graph 200 illustrated in FIG. 2 without the deletion discussed with regard to FIG. 7. Thus, the example of FIG. 8 is independent of the example of FIG. 7. It is understood, however, that if the deletion did occur before the events depicted in FIG. 8 the Duke node would not be a valid member node, as its alumni relationship with Jack Doe would no longer exist.

After receiving the added triple, the system may identify target constraints. As indicated above, target constraints are constraints that include the edge identified by the added triple. In some implementations, the system may use an index, such as query edge index 345 of FIG. 3 to identify target constraints. For example, using the query edge index 345 the system may find an entry for the parent edge in the index and identify the entries for the parent edge as target constraints. In some implementations, the system may read the saved queries 340 and look for constraints that include the parent edge. Based on the graph 200 of FIG. 2 and the saved queries 340 and, optionally, the query edge index 345, the system may identify the target constraints 805. The system may then evaluate the target constraints. In some implementations, the system may intelligently evaluate the constraints. In other words, the system may select choose constraints with smaller lookup paths, or constraints that can re-use saved work for evaluation. For example, one target constraint for query Q2 has a path length of two, and the other has a path length of three. The system may select the constraint with the shorter path length, or may select the parent.occupation="President" constraint because it involves a single edge lookup (the added triple satisfies the first edge in the path). The system may choose to wait to evaluate the parent.parent.occupation="President" constraint of query Q2 and set a state for this constraint to UNKNOWN for the time being. To evaluate the parent.occupation="President" constraint the system may set the Jack Doe node as the member node and follow the newly-added parent edge to the Jane Doe node. The next edge in the constraint is an occupation edge, which leads to the President node. This is the target member node, and satisfies the condition of the constraint, so the system sets the state of the parent.occupation="President" constraint to TRUE for the Jack Doe node. In some implementations, the system may save the member node (e.g., Jack Doe) and the member target node (e.g., President) for the parent.occupation path in temporary lookup results.

The system may also evaluate the target constraint for query Q3. The target constraint for query Q3 includes a single-edge backward walk in the graph, e.g., from Jack Doe via an alumni edge and a forward walk via parent.occupation. In some implementations, the system may be able to re-use the parent.occupation walk from the target constraint for query Q2 to identify the member target node as President. Thus, the system may only perform the backward walk to determine the member nodes for this constraint. Using the graph 200 of FIG. 2 as an example, the system may follow the alumni edge from the Jack Doe node to both the Duke node and the Columbia node. Thus, the system may identify two member nodes: Duke and Columbia. Because the member target node of President satisfies the constraint, the system may set a status of TRUE for the member node Duke and for the member node Columbia. In some implementations, the system may save the backward walk from Jack Doe to Duke and Columbia via the alumni edge in temporary lookup results.

The system may also evaluate the target constraints for query Q4. The path lengths of the two target constraints are equal, and the shortest for the query, so the system may evaluate each constraint. Because the added edge parent is not the first edge in the constraint path, the system performs a backward walk using the alumni edge. In some implementations, the system may use temporary lookup results to identify the Duke and Columbia member nodes for the backward walk, for example because the system performed this walk in evaluating the target constraint for query Q3. The system may start a forward walk from the Jane Doe node for the constraint alumni, parent.birthyear.chinese_zodiac="dog", following the birthyear edge to the 1961 node, and the chinese_zodiac edge to the ox node. Because this is the end of the path in the constraint, the ox node is the member target node for the member nodes of Duke and Columbia. The system may save the member nodes of Duke and Columbia with the member target node of ox for the alumni.parent.birthyear.chinese_zodiac path, for example in temporary lookup results. Because the target member node of ox does not satisfy this constraint, the system may set the state of FALSE for the member node Columbia and the member node Duke.

The system may then evaluate the second constraint for the Q4 query. In some implementations, the system may use results of the previous lookup, e.g., from temporary lookup results, to identify the member nodes of Columbia and Duke and the member target node of ox. Thus, the system need not actually perform any further walks in the graph to evaluate the alumni,parent.birthyear.chinese_zodiac="ox" constraint, and may use the saved lookup to set the state of this constraint to TRUE for the Duke and Columbia member nodes because the member target node of ox does satisfy the constraint. If the system does not save lookups, the system may walk the graph as described above to identify the member nodes and the member target node.

The system may collapse the query definitions using the states determined for the target constraints. As illustrated by the collapsed definitions 810 of FIG. 8, queries Q2 and Q3 collapse to TRUE without further lookups. Accordingly, the system may update the membership of query Q2 to add the member node Jack Doe and the membership of query Q3 to add the member nodes Columbia and Duke, assuming the member nodes are not already in the saved results of the respective queries.

The collapsed query definition for query Q4 does not resolve to TRUE or FALSE, but to the constraint alumni.alumni!=NULL. Accordingly, the system may evaluate the alumni.alumni!=NULL constraint for the member nodes of Columbia and Duke, which are the member nodes that have a state of TRUE for the other constraint in the query definition. Using the graph 200 of FIG. 2 as an example, the system may begin at the Columbia node, follow the alumni edge to the Jack Doe node and follow the alumni edge from Jack Doe to Duke. Thus, the system may determine that for the member node Columbia the member target node is Duke. Because this satisfies the constraint of !=NULL, the system may set a state of TRUE for the Columbia member node. The system may also walk the graph from the Duke node via the alumni edge to the Jack Doe node and from the Jack Doe node to the Columbia node via another alumni edge. Thus, for the Duke member node the member target node is Columbia. Because this satisfies the constraint, the system may set a state of the constraint to TRUE for the Duke member node. The system could have also followed a path from the Duke node to the John Doe node via an alumni edge, and from John Doe to the Michigan node via another alumni edge. However, once the state of the constraint is TRUE, the system need not walk every possible path.

The system may collapse the query definition of query Q4 using the status of the constraints—as illustrated by collapsed definitions 815. The query definition collapses to TRUE for both the Columbia member node and the Duke member node, so the system may add the Columbia and Duke member nodes to the saved query results. The system has now updated the saved query results affected by the addition of the triple, and may move on to process a next triple in a group, or may wait for another update to the data graph.

For readability, the examples above refer to nodes and relationships by names or description. It is understood that the system may use other identifiers in the data structures, the indices, the constraints etc. without departing from disclosed implementations.

FIG. 9 shows an example of a generic computer device 900, which may be system 100, and/or client 170 of FIG. 1, which may be used with the techniques described here. Computing device 900 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 900 includes a processor 902, memory 904, a storage device 906, and expansion ports 910 connected via an interface 908. In some implementations, computing device 900 may include transceiver 946, communication interface 944, and a GPS (Global Positioning System) receiver module 948, among other components, connected via interface 908. Device 900 may communicate wirelessly through communication interface 944, which may include digital signal processing circuitry where necessary. Each of the components 902, 904, 906, 908, 910, 940, 944, 946, and 948 may be mounted on a common motherboard or in other manners as appropriate.

The processor 902 can process instructions for execution within the computing device 900, including instructions stored in the memory 904 or on the storage device 906 to display graphical information for a GUI on an external input/output device, such as display 916. Display 916 may be a monitor or a flat touchscreen display. In some implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk. In some implementations, the memory 904 may include expansion memory provided through an expansion interface.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 904, the storage device 906, or memory on processor 902.

The interface 908 may be a high speed controller that manages bandwidth-intensive operations for the computing device 900 or a low speed controller that manages lower bandwidth-intensive operations, or a combination of such controllers. An external interface 940 may be provided so as to enable near area communication of device 900 with other devices. In some implementations, controller 908 may be coupled to storage device 906 and expansion port 914. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 930, or multiple times in a group of such servers. It may also be implemented as part of a rack server system. In addition, it may be implemented in a personal computing device such as desktop computer 934, laptop computer 932, or tablet or smart phone 936. An entire system may be made up of multiple computing devices 900 communicating with each other. Other configurations are possible.

FIG. 10 shows an example of a generic computer device 1000, which may be system 100 of FIG. 1, which may be used with the techniques described here. Computing device 1000 is intended to represent various example forms of large-scale data processing devices, such as servers, blade servers, datacenters, mainframes, and other large-scale computing devices. Computing device 1000 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1000 may include any number of computing devices 1080. Computing devices 1080 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1080a includes multiple racks 1058a-1058n. Each rack may include one or more processors, such as processors 1052a-1052n and 1062a-1062n. The processors may include data processors, network attached storage devices, and other computer controlled devices. In some implementations, one processor may operate as a master processor and control the scheduling and data distribution tasks. Processors may be interconnected through one or more rack switches 1058, and one or more racks may be connected through switch 1078. Switch 1078 may handle communications between multiple connected computing devices 1000.

Each rack may include memory, such as memory 1054 and memory 1064, and storage, such as 1056 and 1066. Storage 1056 and 1066 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1056 or 1066 may be shared between multiple processors, multiple racks, or multiple computing devices and may include a computer-readable medium storing instructions executable by one or more of the processors. Memory 1054 and 1064 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1054 may also be shared between processors 1052a-1052n. Data structures, such as an index, may be stored, for example, across storage 1056 and memory 1054. Computing device 1000 may include other components not shown, such as controllers, buses, input/output devices, communications modules, etc.

An entire system, such as system 100, may be made up of multiple computing devices 1000 communicating with each other. For example, device 1080a may communicate with devices 1080b, 1080c, and 1080d, and these may collectively be known as system 100. As another example, system 100 of FIG. 1 may include one or more computing devices 1000 as saved query engine 150. Furthermore, some of the computing devices may be located geographically close to each other, and others may be located geographically distant. The layout of system 1000 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Random Access Memory (RAM) and Read Only Memory (ROM)), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   at least one processor; and
   at least one memory storing:
      a plurality of saved queries, each query defined by one or more constraints to be satisfied for membership in query results for the query, each constraint specifying at least one edge from a knowledge base storing nodes connected by edges,
      an index of the constraints by edge, the index being organized by edge, and
      instructions that, when executed by the at least one processor, cause the system to:
         identify, using the index, a target constraint responsive to an operation that updates the knowledge base with a source node, an update edge, and a target node, the target constraint specifying a path that includes the update edge and the target constraint belonging to a first saved query,
         evaluate the target constraint for a member node to determine a state for the target constraint by traversing the knowledge base via the path of the target constraint,
         determine, using the state, whether the state results in a change to a saved query result for the first saved query, and
         update the saved query result responsive to determining the state results in a change.

2. The system of claim 1, wherein the index identifies, for each edge included in the index, a query identifier and the path that includes the edge.

3. The system of claim 2, wherein the path specifies a target entity.

4. The system of claim 1, wherein a plurality of constraints belong to the first saved query in a conjunctive manner and responsive to the state resolving to FALSE, updating the saved query results includes removing the member node without evaluating the remaining plurality of constraints.

5. The system of claim 1, wherein a plurality of constraints belong to the first saved query in a disjunctive manner and responsive to the state resolving to TRUE, updating the saved query results includes:
   determining whether the member node is included in the saved query results; and
   adding the member node responsive to determining the member node is not included.

6. The system of claim 1, wherein the system identifies a plurality of constraints responsive to the operation, each constraint belonging to the first saved query and the instructions further include instructions that, when executed by the at least one processor, cause the system to:
   evaluate the plurality of constraints in order of shortest path to longest path, wherein:
      subsequent to evaluating a path, the system evaluates the state for the first saved query, and
      responsive to failing to resolve the state for the first saved query, evaluating a constraint in the plurality of constraints with a next shortest path.

7. The system of claim 1, wherein the target constraint has a path that includes the update edge and a second edge and the target constraint appears in the index for the update edge and the second edge in the path.

8. A method comprising:
receiving a real-time update for a graph that includes a source node, an edge, and a target node;
identifying, using an index of constraints organized by edge, target constraints that include the edge, the index including, for each target constraint, a saved query identifier and the target constraint;
for target constraints with a path length of one, identifying the source nodes as member nodes;
for target constraints with a path length greater than one:
traversing the graph to identify member nodes; and
for each saved query associated with one of the target constraints in the index:
determining a respective state for each of the target constraints,
determining, based on the respective state, whether the member node is responsive to the saved query; and
adding the member node to a saved query result for the saved query when the member node is responsive and not already in the saved query result.

9. The method of claim 8, wherein the real-time update is included in a batch of real-time updates, the real-time updates being received within minutes of the update being applied to the graph.

10. The method of claim 8, wherein the update includes an addition of the edge between the source node and the target node.

11. The method of claim 8, wherein the update includes a removal of the edge between the source node and the target node.

12. The method of claim 8, wherein for each saved query, the method includes determining the respective state for target constraints with shorter path lengths ahead of target constraints with longer path lengths.

13. The method of claim 8, wherein a plurality of the target constraints are associated with a first saved query in a disjunctive manner and adding the member node occurs responsive to determining a first constraint in the plurality resolves to TRUE.

14. The method of claim 8, wherein determining whether the member node is responsive to the saved query includes determining whether a collapsed constraint expression for the query indicates the member node is responsive.

15. The method of claim 14, wherein responsive to the state of a target constraint for the saved query fails to indicate whether the member node is responsive, the method includes determining a state for a next constraint for the saved query, the next constraint having a shortest path length of remaining constraints for the saved query.

16. A computer-implemented method comprising:
responsive to an operation that updates a data graph, the update operation affecting a source node, an edge, and a target node, identifying, in an index of constraints, a target constraint of a saved query, the target constraint specifying a path in the data graph that includes the edge affected by the update operation;
determining, using at least one processor, a state for a member node for the target constraint by traversing the data graph from the member node via the path;
determining, based at least on the state, that the member node represents a change to a saved query result for the saved query; and
updating a saved query result for the saved query using the member node identified during the traversal in accordance with the change.

17. The method of claim 16, wherein the target constraint has a path length of one and the member node is the source node.

18. The method of claim 16, wherein the target constraint includes the edge and a second edge, the edge appearing after the second edge, and the method further includes:
traversing the data graph from the source node to another node following the second edge, the another node being the member node.

19. The method of claim 16, wherein the target constraint includes a path having the edge and a second edge, the edge appearing after the second edge in the path, and the method further includes:
traversing the data graph from the source node to another node via the second edge, the another node being the member node; and
saving the another node in a temporary lookup table.

20. The method of claim 16, wherein the target constraint is a first target constraint in a plurality of target constraints of the saved query, each of the plurality of target constraints specifying a path in the data graph that includes the edge affected by the update operation, and the method further includes:
determining that the first target constraint has a shortest path of the plurality of target constraints;
determining that the state of the target constraint fails to determine whether the member node represents a change to the saved query result; and
repeating the determining of a state for a target constraint of the plurality of constraints having a next shortest path until one of the plurality of target constraints determines whether the member node represents a change to the saved query result.

* * * * *

UNITED STATES PATENT AND TRADEMARK OFFICE
CERTIFICATE OF CORRECTION

PATENT NO. : 9,996,581 B2
APPLICATION NO. : 15/488852
DATED : June 12, 2018
INVENTOR(S) : Behal et al.

It is certified that error appears in the above-identified patent and that said Letters Patent is hereby corrected as shown below:

On the Title Page

Column 1, Item (*), in "Notice", Line 3, delete "days. days." and insert --days.--, therefor.

Column 2, Item (74), in "Attorney, Agent, or Firm", Line 2, delete "Ballermann" and insert --Bellermann--, therefor.

Signed and Sealed this
Seventh Day of August, 2018

Andrei Iancu
*Director of the United States Patent and Trademark Office*